(12) United States Patent
McGee

(10) Patent No.: US 12,542,780 B2
(45) Date of Patent: Feb. 3, 2026

(54) SESSIONS CORRELATION FOR MULTIPLE DEVICE AUTHENTICATION

(71) Applicant: MASTERCARD TECHNOLOGIES CANADA ULC, Vancouver (CA)

(72) Inventor: Perry McGee, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 224 days.

(21) Appl. No.: 18/400,805

(22) Filed: Dec. 29, 2023

(65) Prior Publication Data

US 2024/0223559 A1 Jul. 4, 2024

Related U.S. Application Data

(60) Provisional application No. 63/478,034, filed on Dec. 30, 2022.

(51) Int. Cl.
*H04L 9/40* (2022.01)
*H04L 65/1069* (2022.01)

(52) U.S. Cl.
CPC ...... *H04L 63/0884* (2013.01); *H04L 65/1069* (2013.01)

(58) Field of Classification Search
CPC .................... H04L 63/0884; H04L 65/1069
See application file for complete search history.

(56) References Cited

U.S. PATENT DOCUMENTS

| | | | |
|---|---|---|---|
| 2014/0237582 A1 | 8/2014 | Niemela | |
| 2014/0237591 A1 | 8/2014 | Niemela et al. | |
| 2014/0347591 A1 | 11/2014 | Park et al. | |
| 2019/0247199 A1 | 8/2019 | Stinchfield et al. | |
| 2019/0279199 A1 | 9/2019 | Sheets et al. | |
| 2021/0306346 A1* | 9/2021 | Han | H04L 63/083 |
| 2023/0367472 A1* | 11/2023 | Clarke | G06F 11/3072 |

FOREIGN PATENT DOCUMENTS

| | | |
|---|---|---|
| CN | 103457951 A | 12/2013 |
| CN | 113806723 A | 12/2021 |

OTHER PUBLICATIONS

International Search Report and Written Opinion for Application No. PCT/CA2023/051772 dated Mar. 19, 2024 (13 pages).
Hajny, J. et al. "Multi-Device Authentication using Wearables and IoT." Proceedings of the 13th International Joint Conference on e-Business and Telecommunications. SECRYPT. 2016, (6 pages).

* cited by examiner

*Primary Examiner* — Kristie D Shingles
(74) *Attorney, Agent, or Firm* — Michael Best & Friedrich LLP

(57) ABSTRACT

Devices, methods, and computer-readable media that perform sessions correlation for multiple device authentication. In one embodiment, a server may include an electronic processor communicatively coupled to the memory, the electronic processor is configured to: establish a first session with a first user interface device, establish a second session with a second user interface device that is different from the first user interface device, receive, from a third-party server, a score request including information that correlates the second session with the first session, generate a score on a correlation of the first session to the second session, and output the score indicating a level of multiple device authentication, the score also being a control signal for authorizing or denying a multi-factor authentication at the third-party server.

20 Claims, 12 Drawing Sheets

SESSIONS CORRELATION FOR MULTIPLE DEVICE AUTHENTICATION

CROSS-REFERENCE TO RELATED APPLICATION

This application claims priority to, and the benefit of, U.S. Provisional Application No. 63/478,034, filed on Dec. 30, 2022, the entire contents of which is incorporated herein by reference.

FIELD

The present disclosure relates generally to multiple device authentication. More specifically, the present disclosure relates to devices, methods, systems, and computer-readable media that perform sessions correlation for multi-factor authentication.

BACKGROUND

Multi-factor authentication (MFA) is commonly used to authenticate a user device and takes various different forms. One of the most common forms of MFA is a user entering a password on a user interface device followed by entering a one-time-password (OTP) on the user interface device.

MFA requires two of three factors to be satisfied in order to perform a valid authentication. The three factors are an inherence factor, a possession factor, and a knowledge factor. The password and the OTP satisfy the possession factor and the knowledge factor.

However, a challenge exists with MFA because a user may use different devices to enter the OTP after the password. For example, a user may use a desktop computer to enter the password and a mobile phone to enter the OTP. However, generating a MFA score when the user uses two different devices is challenging because the two different devices have different and uncorrelated sessions.

SUMMARY

The present disclosure solves the aforementioned challenge by performing session correlation for multiple device authentication. The correlation of a first MFA user session on a first computing device to a second MFA user session on a second computing device may be used to generate a single MFA score that is more accurate and a better representation of the user's MFA than a MFA score derived by combining two separate MFA scores from the first MFA user session and the second MFA user session.

The correlation of a first MFA user session on a first computing device to a second MFA user session on a second computing device may be used to generate a single MFA score that achieves more than the expected sum because the single MFA score of two correlated sessions is more accurate than a combined MFA score from two different uncorrelated sessions.

In one example use case, a server detects whether the two devices used in the authentication are within a certain distance. When the devices are not within the certain distance, the server will flag the authentication as risky and additional information may be requested or the authentication request may just be denied. In some examples, the server may also determine whether any rules or policies were triggered on the correlated session to make a better decision on the current session without polluting the current session with any data points from the correlated session.

One example of the present disclosure is a server for performing multiple device authentication, the server including: a memory including a multi-factor authentication (MFA) service, and an electronic processor communicatively coupled to the memory, the electronic processor is configured to: establish a first session with a first user interface device, establish a second session with a second user interface device that is different from the first user interface device, receive, from a third-party server, a score request including information that correlates the second session with the first session, generate a score on a correlation of the first session to the second session, and output the score indicating a level of multiple device authentication, the score also being a control signal for authorizing or denying a multi-factor authentication at the third-party server.

Another example of the present disclosure includes a method for performing multiple device authentication, the method including: establishing, with an electronic processor, a first session with a first user interface device; establishing, with the electronic processor, a second session with a second user interface device that is different from the first user interface device; receiving, with the electronic processor, a score request including information that correlates the second session with the first session, the score request being from third-party server; generating, with the electronic processor, a score on a correlation of the first session to the second session; and outputting, with the electronic processor, the score indicating a level of multiple device authentication, the score also being a control signal for authorizing or denying a multi-factor authentication at the third-party server.

Yet another example of the present disclosure is a non-transitory computer-readable medium including instructions that, when executed by an electronic processor, cause the electronic processor to perform a set of operations including: establishing a first session with a first user interface device; establishing a second session with a second user interface device that is different from the first user interface device; receiving, from a third-party server, a score request including information that correlates the second session with the first session; generating a score on a correlation of the first session to the second session; and outputting the score indicating a level of multiple device authentication, the score also being a control signal for authorizing or denying a multi-factor authentication at the third-party server.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
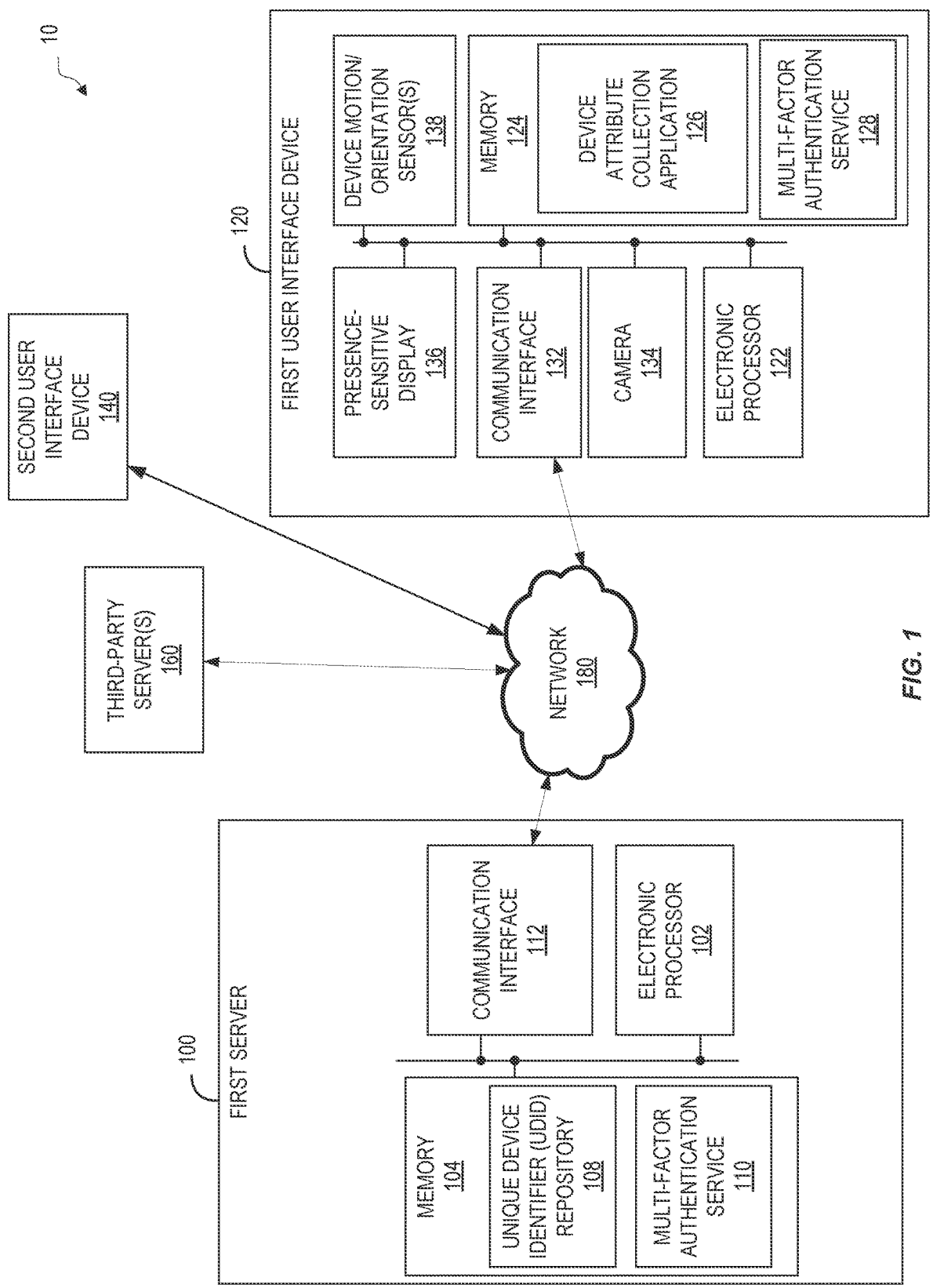
FIG. 1 is a block diagram illustrating a system with multiple device authentication using a multi-factor authentication service, in accordance with various aspects of the present disclosure.

FIG. 1 is a block diagram illustrating a system with multiple device authentication using a multi-factor authentication service, in accordance with various aspects of the present disclosure. It should be understood that, in some embodiments, there are different configurations from the configuration illustrated in FIG. 1. The functionality described herein may be extended to any number of servers providing distributed processing.

In the example of FIG. 1, the system 10 includes a first server 100, a first user interface device 120, a second user interface device 140, third-party server(s) 160, and a network 180. The first server 100 includes an electronic processor 102 (for example, a microprocessor or another suitable processing device), a memory 104 (for example, a non-transitory computer-readable storage medium), and a communication interface 112. It should be understood that, in some embodiments, the first server 100 may include fewer or additional components in configurations different from that illustrated in FIG. 1. Also, the first server 100 may perform additional functionality than the functionality described herein. In addition, the functionality of the first server 100 may be incorporated into other servers, e.g., the third-party server(s) 160. As illustrated in FIG. 1, the electronic processor 102, the memory 104, and the communication interface 112 are electrically coupled by one or more control or data buses enabling communication between the components.

The electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store machine-executable instructions regarding a multi-factor authentication service 110. In some examples, the data storage area may store data regarding a unique device identifier (UDID) repository 108.

The multi-factor authentication service 110 includes a unique device identifier (UDID) component. The UDID component includes device identification rules that may identify the first user interface device 120 based on a plurality of device attributes. In other words, the UDID component turns device attributes and additional context data into a device identifier that is unique to the device (i.e., a first UDID that is unique to the first user interface device 120 and a second UDID that is unique to the second user interface device 140).

Further, in some examples, the unique device identifier (UDID) component performs the functions described herein with respect to "multi-factor authentication" entirely within the first server 100. In other examples, the unique device identifier (UDID) component are sets of instructions for performing the functions described herein with respect to "multi-factor authentication" with third-party server(s) 160.

The multi-factor authentication service 110 causes the electronic processor 102 to collect device attributes, generate UDIDs, and store the UDIDs in the UDID repository 108. Specifically, the multi-factor authentication service 110 causes the electronic processor 102 to parse the device attributes received from a user interface device, determine a UDID based on the device attributes, and perform multiple device authentication using an authentication algorithm that compares a current UDID to one or more historical UDIDs.

In some examples, the UDID repository 108 is a central repository including a plurality of UDIDs. Each UDID is associated with a specific user interface device.

In some examples, the multi-factor authentication service 110 may be a frictionless MFA service that further includes a passive biometrics component that includes a plurality of passive biometrics models that may identify a user of the first user interface device 120 based on a plurality of input profile records that are stored in a input profile record repository. In other words, the passive biometrics component may turn behavioral data into a biometrics match assessment against a historical profile (e.g., input profiles records from an input profile record repository that is similar to the UDID repository 108).

The communication interface 112 receives data from and provides data to devices external to the first server 100, such as the first user interface device 120 and the second user interface device 140 via the network 180. For example, the communication interface 112 may include a port or connection for receiving a wired connection (for example, an Ethernet cable, fiber optic cable, a telephone cable, or the like), a wireless transceiver, or a combination thereof. In some examples, the network 180 is the Internet.

In the example of FIG. 1, the first user interface device 120 includes an electronic processor 122 (for example, a microprocessor or another suitable processing device), a memory 124 (for example, a non-transitory computer-readable storage medium), a communication interface 132, a camera 134, a presence-sensitive display 136, and a device motion/orientation sensor(s) 138. In some examples, the user interface device may be a smartphone, tablet, laptop, desktop, or other suitable user interface device with a presence-sensitive display and an orientation sensor. As illustrated in FIG. 1, the electronic processor 122, the memory 124, the communication interface 132, the camera 134, the presence-sensitive display 136, and the device motion/orientation sensor(s) 138 are electrically coupled by one or more control or data buses enabling communication between the components.

The electronic processor 122 executes machine-readable instructions stored in the memory 124. For example, the electronic processor 122 may execute instructions stored in the memory 124 to perform the functionality described herein.

The memory 124 may include a program storage area (for example, read only memory (ROM)) and a data storage area (for example, random access memory (RAM), and other non-transitory, machine-readable medium). The program storage area includes a device attribute collection application 126 and a multi-factor authentication service 128. In some examples, the device attribute collection application 126 and the multi-factor authentication service 128 may each be a standalone application. In other examples, the device attribute collection application 126 and the multi-factor authentication service 128 may be part of a separate application (e.g., a camera application, a banking application, or other suitable application).

The device attribute collection application 126 causes the electronic processor 122 to collect device attributes (e.g., Internet Protocol (IP) address, browser attributes (user agent, screen resolution, browser plugins, color depth), or other available device attributes that may be used to identify a device) of the first user interface device 120 and transmit the device attributes to the first server 100. Additionally, in some examples, the device attribute collection application 126 may cause electronic processor 122 to control the memory 124 to store the device attributes that are collected for a period of time or until the device attributes are output to the first server 100.

The multi-factor authentication service 128 outputs data regarding the first user interface device 120 and the user of the first user interface device 120. For example, the multi-factor authentication service 128 retrieves device attributes of the first user interface device 120 and outputs the device attributes to the first server 100.

The multi-factor authentication service 128 outputs the collected data to the first server 100 along with a multi-factor authentication request when the user of the first user interface device 120 accesses a resource that requires multi-factor authentication. As described in greater detail below, the multi-factor authentication service 128 interacts with the multi-factor authentication service 110 to provide the user of the first user interface device 120 with multi-factor authentication.

The communication interface 132 receives data from and provides data to (e.g., collected device attributes) devices external to the first user interface device 120, e.g., the server 100, and the third-party server(s) 160. For example, the communication interface 132 may include a port or connection for receiving a wired connection (for example, an Ethernet cable, fiber optic cable, a telephone cable, or the like), a wireless transceiver, or a combination thereof.

The camera 134 includes an image sensor that generates and outputs image data of a subject. In some examples, the camera 134 includes a semiconductor charge-coupled device (CCD) image sensor, a complementary metal-oxide-semiconductor (CMOS) image sensor, or other suitable image sensor. The electronic processor 122 receives the image data of the subject that is output by the camera 134.

The presence-sensitive display 136 includes a display screen with an array of pixels that generate and output images. In some examples, the display screen is one of a liquid crystal display (LCD) screen, a light-emitting diode (LED) and liquid crystal display (LCD) screen, a quantum dot light-emitting diode (QLED) display screen, an interferometric modulator display (IMOD) screen, a micro light-emitting diode display screen (mLED), a virtual retinal display screen, or other suitable display screen. The presence-sensitive display 136 also includes circuitry that is configured to detect the presence of the user. In some examples, the circuitry is a resistive or capacitive panel that detects the presence of an object (e.g., a user's finger).

The device motion/orientation sensor(s) 138 is a sensor that detects a movement and/or an orientation of the first user interface device 120. In some examples, the device motion/orientation sensor(s) 138 is an accelerometer, gyroscope, magnetometer, or other suitable device motion/orientation sensor that detects the motion and/or orientation of the first user interface device 120.

It should be understood that, in some embodiments, the server 100 may include fewer or additional components in configurations different from that illustrated in FIG. 1. Also, the server 100 may perform additional functionality than the functionality described herein. In addition, some of the functionality of the first user interface device 120 (for example, the IPR generation) may be incorporated into other servers (e.g., incorporated into the server 100 or the third-party server(s) 160). Likewise, some of the functionality of the server 100 may be incorporated into the first user interface device 120 (for example, functionality associated with a unique device identifier (UDID) component and a passive biometrics component).

The third-party server(s) 160 may be similar to the first server 100. For example, the third-party server(s) 160 may include an electronic processor (for example, a microprocessor or another suitable processing device), a memory (for example, a non-transitory computer-readable storage medium), and a communication interface. It should be understood that, in some embodiments, the third-party server(s) 160 may include fewer or additional components in configurations different from the first server 100 that is illustrated in FIG. 1. Also, the third-party server(s) 160 may perform additional or different functionality than the functionality described herein with respect to the first server 100. In other embodiments, the functionality described herein with respect to the third-party server(s) 160 may be performed by the first server 100 and the third-party server(s) 160 may be omitted. Additionally, "third-party" refers to an entity that is completely separate and distinct from an entity that owns the first server 100.

Figure 2:
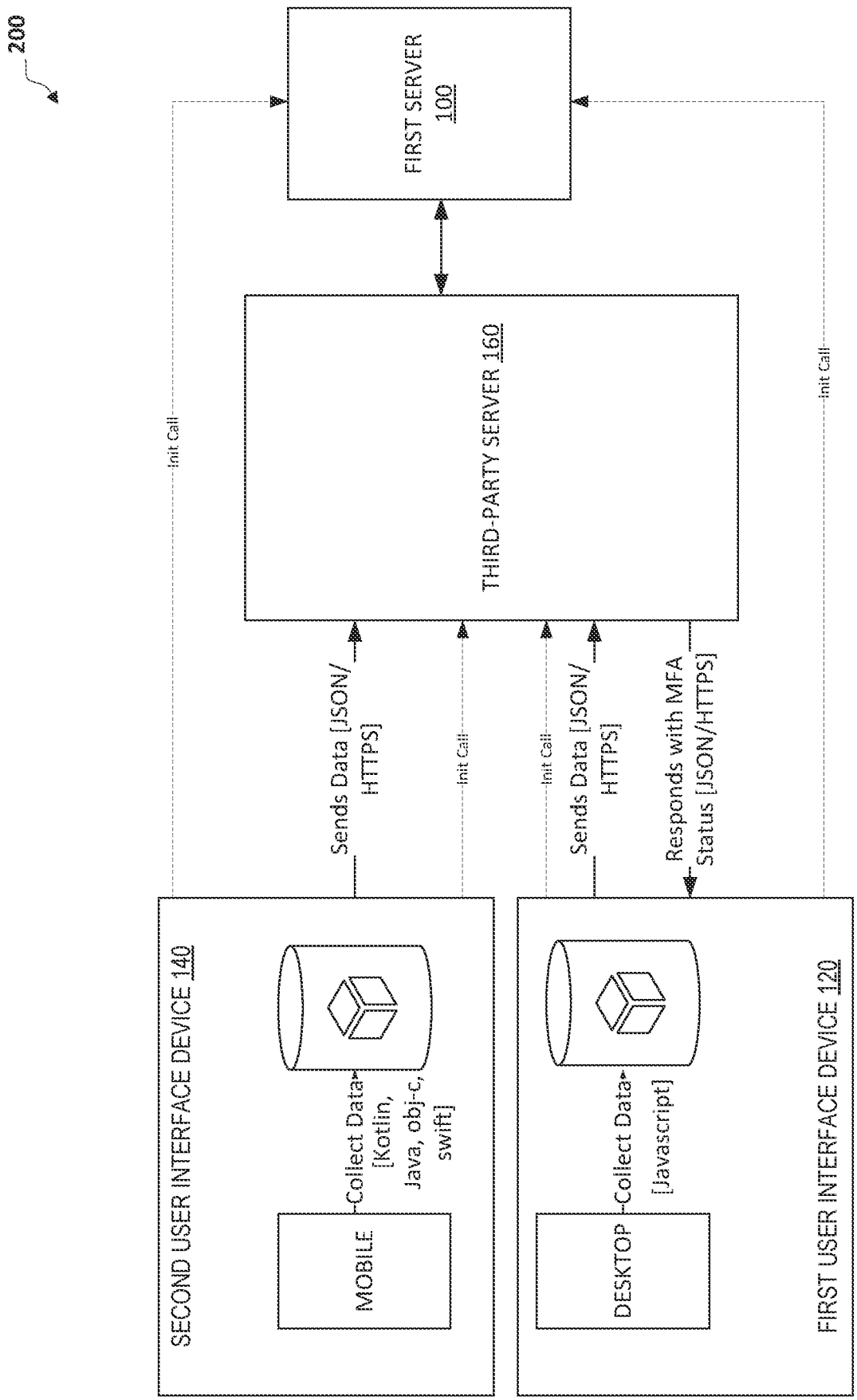
FIG. 2 is a flow diagram illustrating communication between the first server, the first user interface device, the second user interface device, and the third-party server(s) of FIG. 1, in accordance with various aspects of the present disclosure.

FIG. 2 is a flow diagram illustrating communication between the first server 100, the first user interface device 120, the second user interface device 140, and the third-party server(s) 160 of FIG. 1, in accordance with various aspects of the present disclosure. As illustrated in FIG. 2, the second example 200 includes the first user interface device 120 and the second user interface device 140 communicating with the third-party server(s) 160, and the third-party server(s) 160 is interacting with the first server 100.

In the example of FIG. 2, the first user interface device 120 may be a mobile device or a desktop device performing the device attribute collection application 126 to collect data regarding device attributes and user inputs. When a user accesses a resource (e.g., webpage, application, or other resource associated with the third-party server(s) 160) that requires MFA, the first user interface device 120 performs the multi-factor authentication service 128 by outputting a MFA request along with the collected data to the third-party server(s) 160 via the network 180. For example, when a user enters a password to a bank application, the first user interface device 120 performs the multi-factor authentication service 128 by outputting a MFA request along with the collected data (and optionally, an Init call) to the first server 100 via the network 180. In some examples, the optional Init call may be sent directly to the first server 100 via the network 180. In other examples, the optional Init call may optionally be sent indirectly to the first server 100 via the third-party server 160.

With respect to the mobile device, data collection may be output in the form of Kotlin, Java, Objective-C (obj-c), swift, or other suitable programming language. With respect to the desktop device, data collection may be output in the form of JavaScript Object Notation (JSON), Hypertext Transfer Protocol Secure (HTTPS), or other suitable programming language.

When the third-party server(s) 160 receives the MFA request and the collected data from the first user interface device 120, the third-party server(s) 160 requests the first server 100 to perform the multi-factor authentication service 110 by extracting the device attributes and the user inputs from the collected data and providing device attributes to a UDID component of the first server 100.

When the first server 100 receives the device attributes from the third-party server(s) 160, the first server 100 performs the multi-factor authentication service 110 by identifying the second user interface device 140 and requesting a second MFA input and collected data to be sent to the first server 100 via the network 180 (e.g., directly or through the third-party server(s) 160).

The UDID component of the first server 100 generates a first UDID for the first user interface device 120 based on the device attributes of the first user interface device 120 and a second UDID for the second user interface device 140 based on the device attributes of the second user interface device 140. In some examples, the first server 100 may also include a passive biometrics component that generates a biometrics match assessment against a historical profile (e.g., against some of the plurality of IPRs).

Upon generating the first UDID and the second UDID, the first server 100 determines a multi-factor authentication score (e.g., a high score indicates authentication and a low score indicates denied authentication, or alternatively, a high score indicates denied authentication and a low score indicates authentication) based on device attributes (and in some examples, the biometrics match assessment), and providing the MFA score to the third-party server(s) 160. In some examples, the sessions are tracked and established from within an application. When the application needs an assessment of a transaction within a session, the application may send the first server 100 (either directly or via the third-party server(s) 160) the session ID along with the request data when the application makes a score call. Additionally, although "multiple device authentication" is described herein, this authentication is also applicable to two applications being operated on the same user interface device, where the device may generate the same UDID, but the UDIDs will be in two different sessions.

The multi-factor authentication status from the first server 100 may be output to the third-party server(s) 160 in the form of XML, Protobufs, custom binary formats, or other suitable transport formats. When receiving the MFA score from the first server 100, the third-party server(s) 160 may provide the MFA status to the resource (e.g., application) being accessed by the user. The resource authorizes or denies the user's access to the resource based on the MFA status that is received.

In some examples, the UDID component and the passive biometrics component may be components that are internal to the multi-factor authentication service 110. In other examples, the UDID component and the passive biometrics component may be standalone servers that are external and remote to the first server 100 and the third-party server(s) 160.

FIGS. 3-6 are flowcharts illustrating an example of correlated sessions 300 between an end user 302, a first user interface device 304, a second user interface device 306, a third-party server 308, and a first server 310, in accordance with various aspects of the present disclosure. The first user interface device 304, the second user interface device 306, the third-party server 308, the first server 310 may generally correspond to the first user interface device 120, the second user interface device 140, the third-party server(s) 160, and the first server 100 of FIG. 1, respectively.

Figure 3:
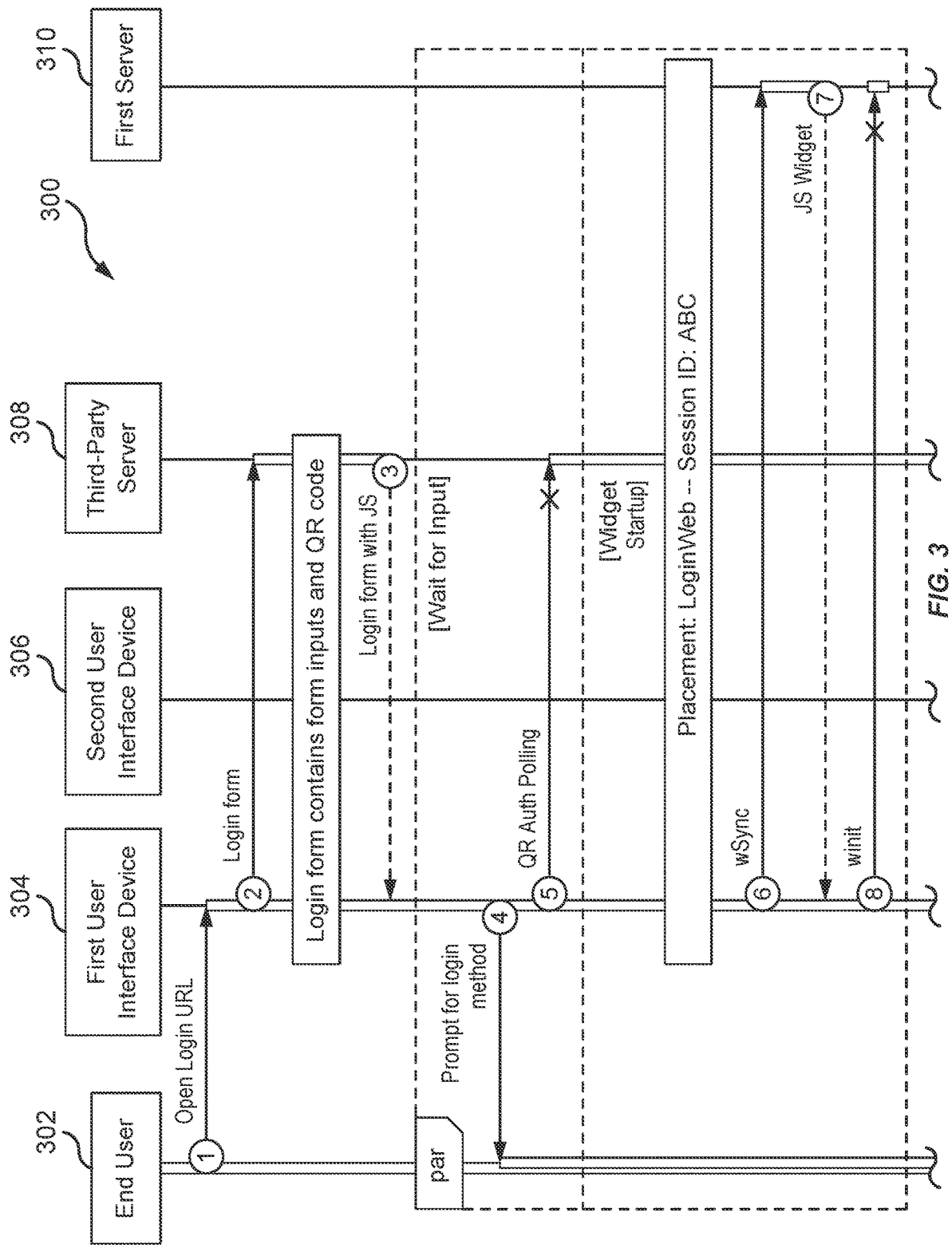
FIGS. 3-6 are flowcharts illustrating an example of correlated sessions between an end user, a first user interface device, a second user interface device, a third-party server, a first server, in accordance with various aspects of the present disclosure.
Figure 3:
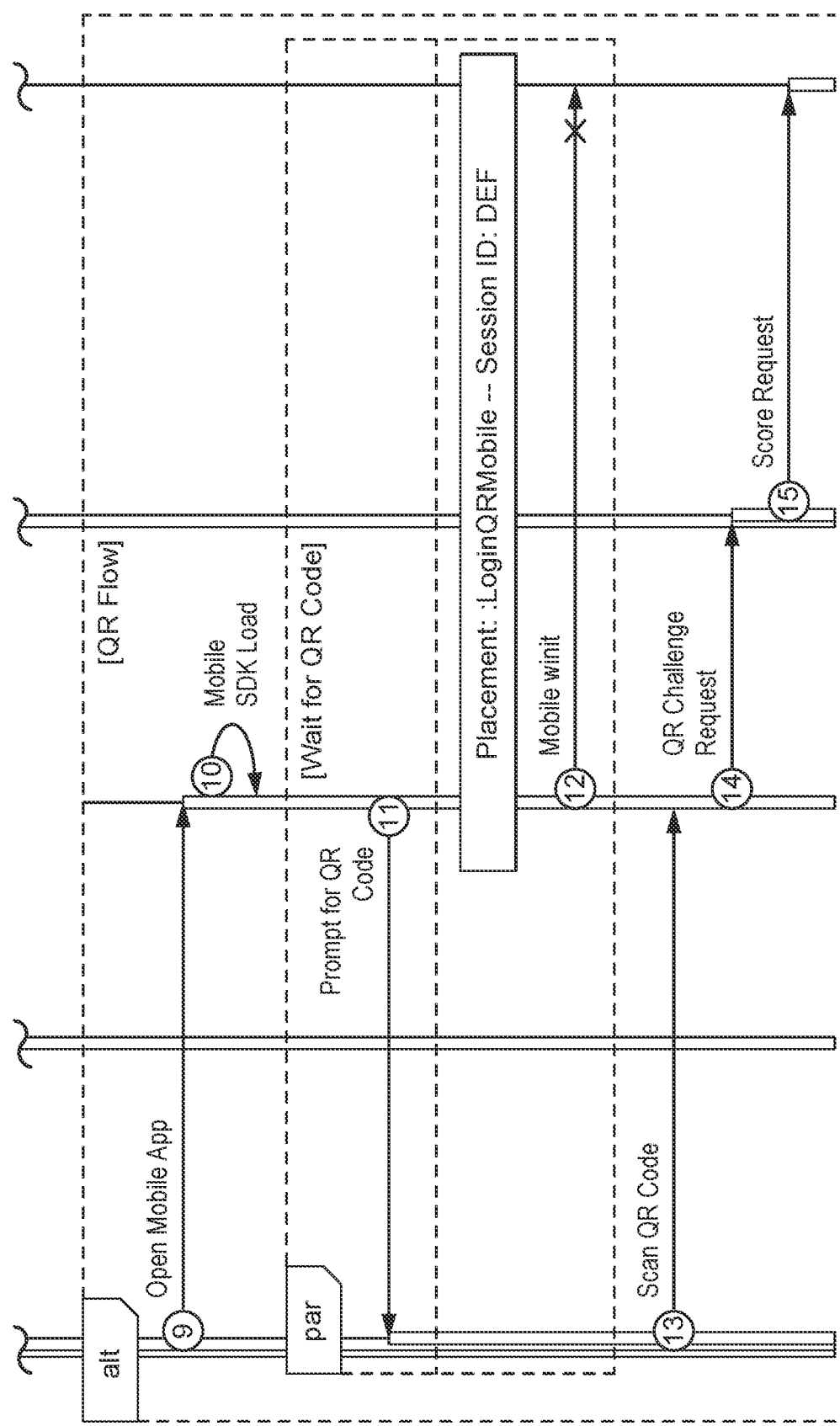
Figure 4:
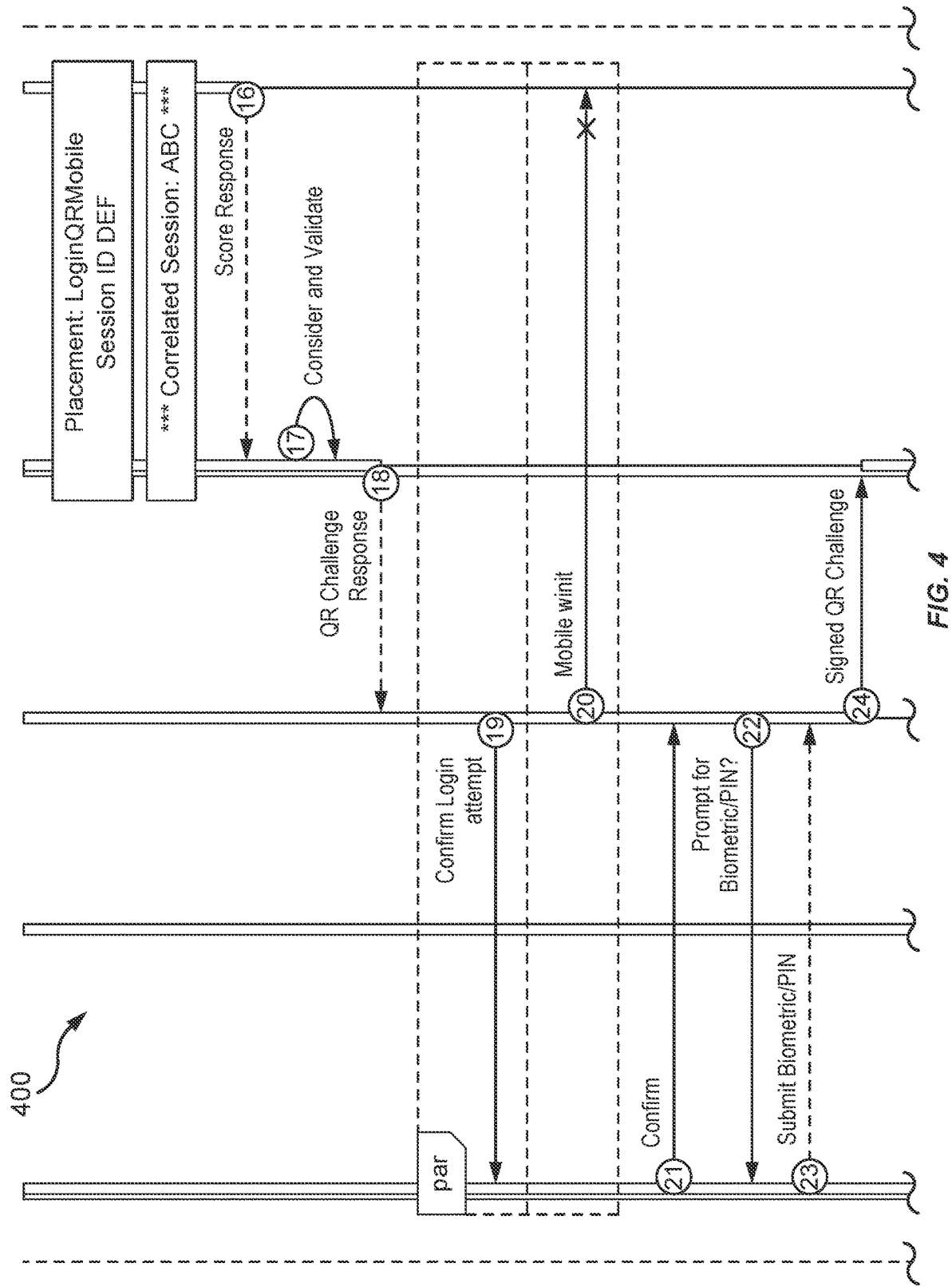
Figure 4:
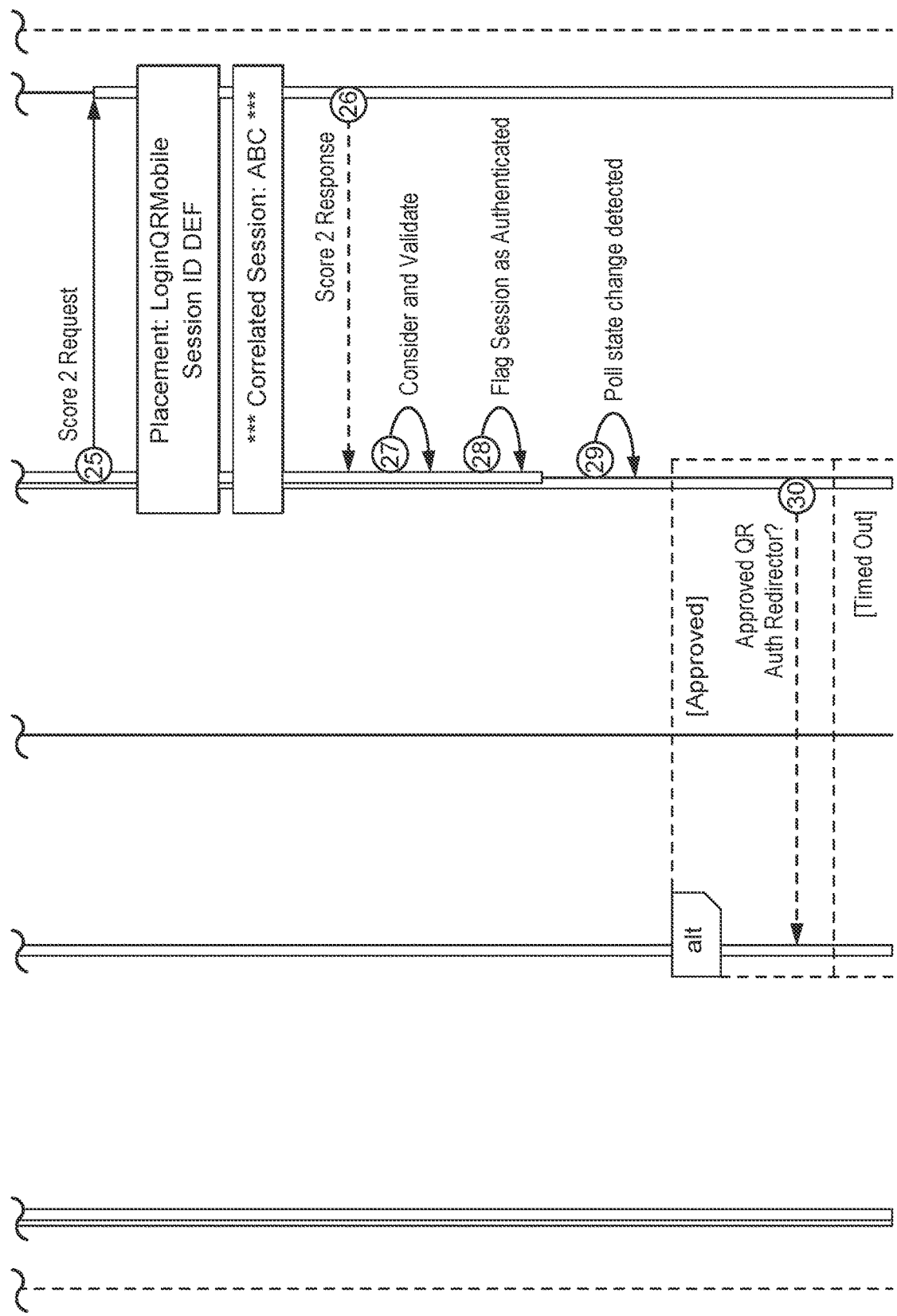
Figure 5:
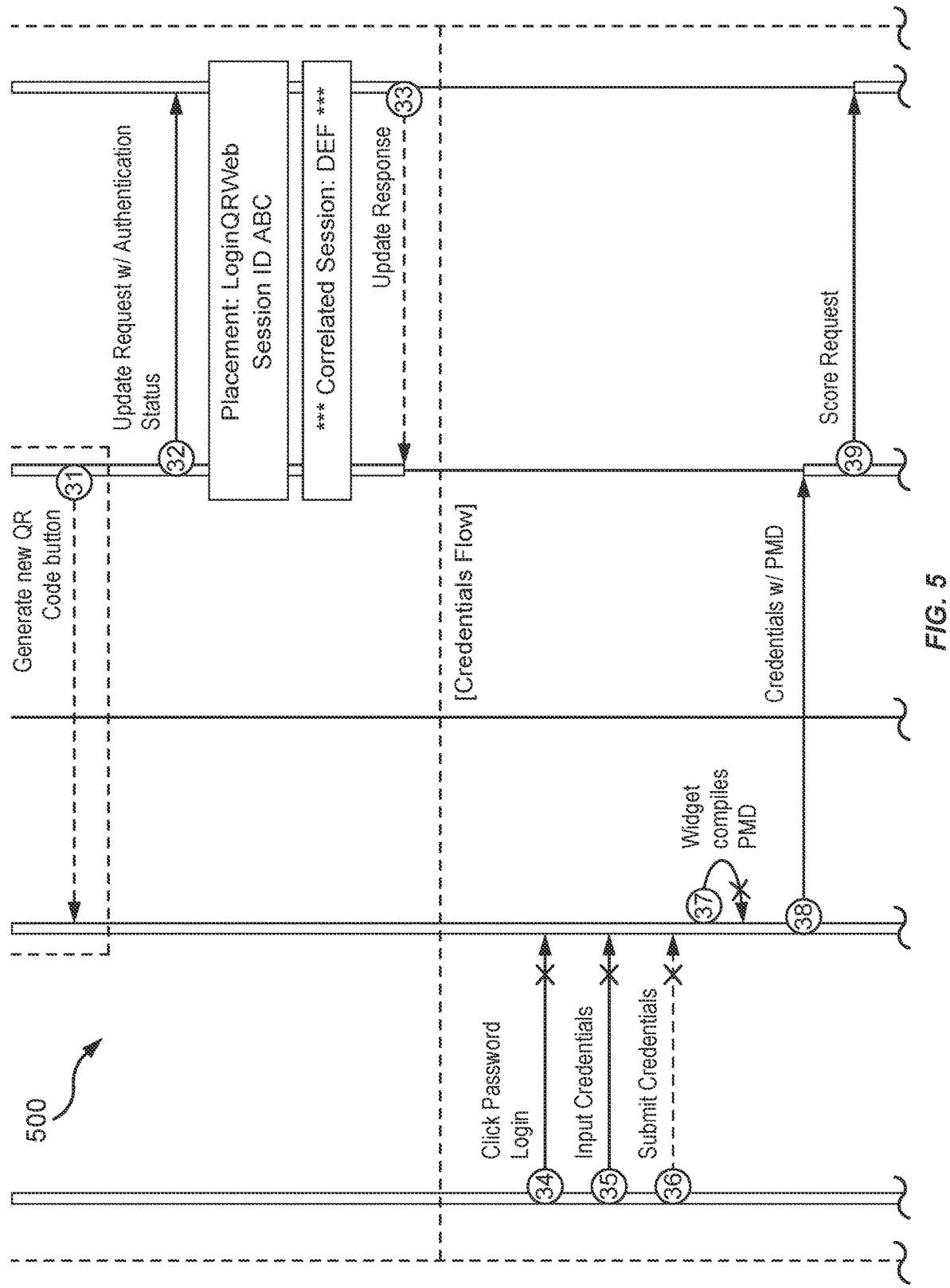
Figure 5:
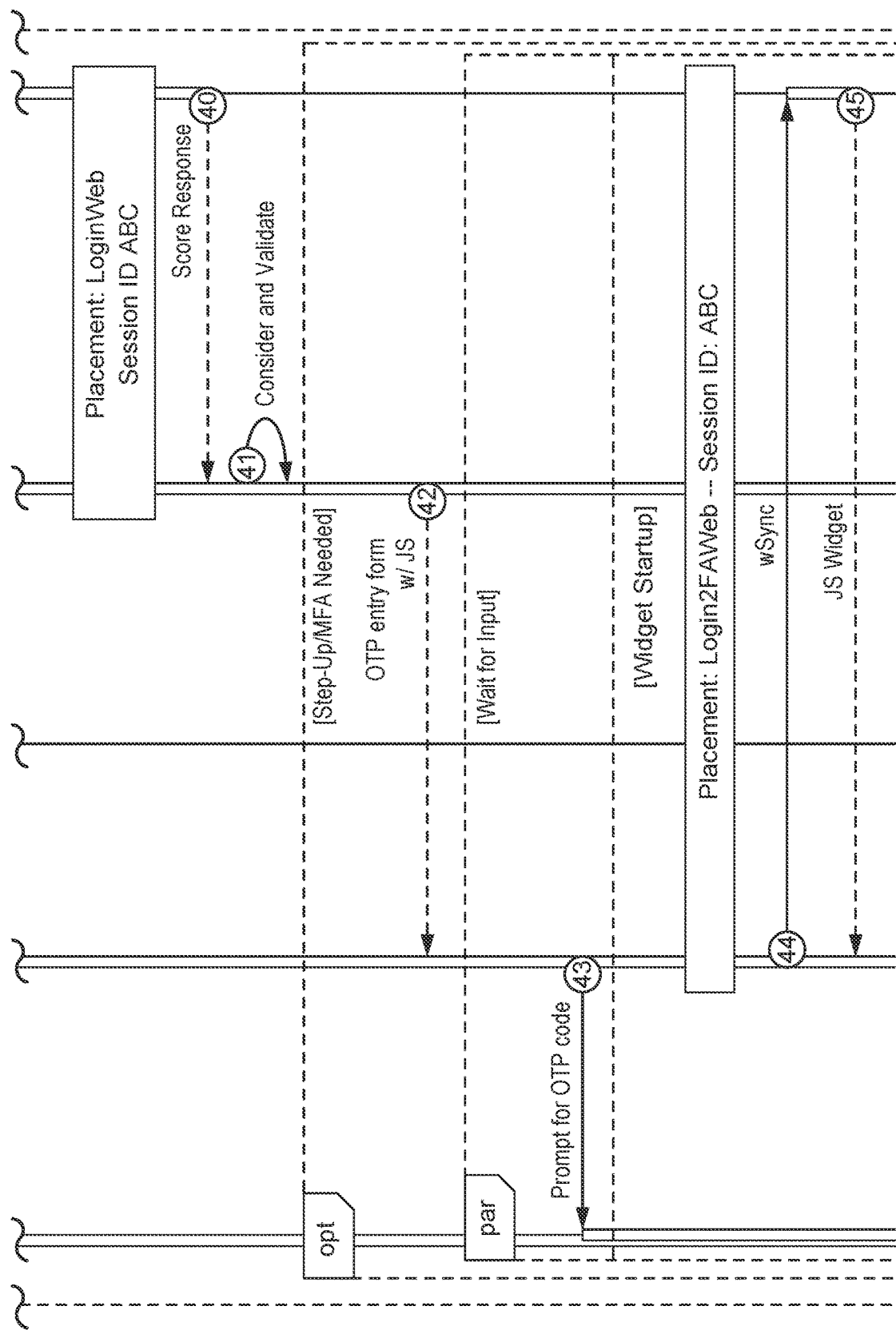
Figure 6:
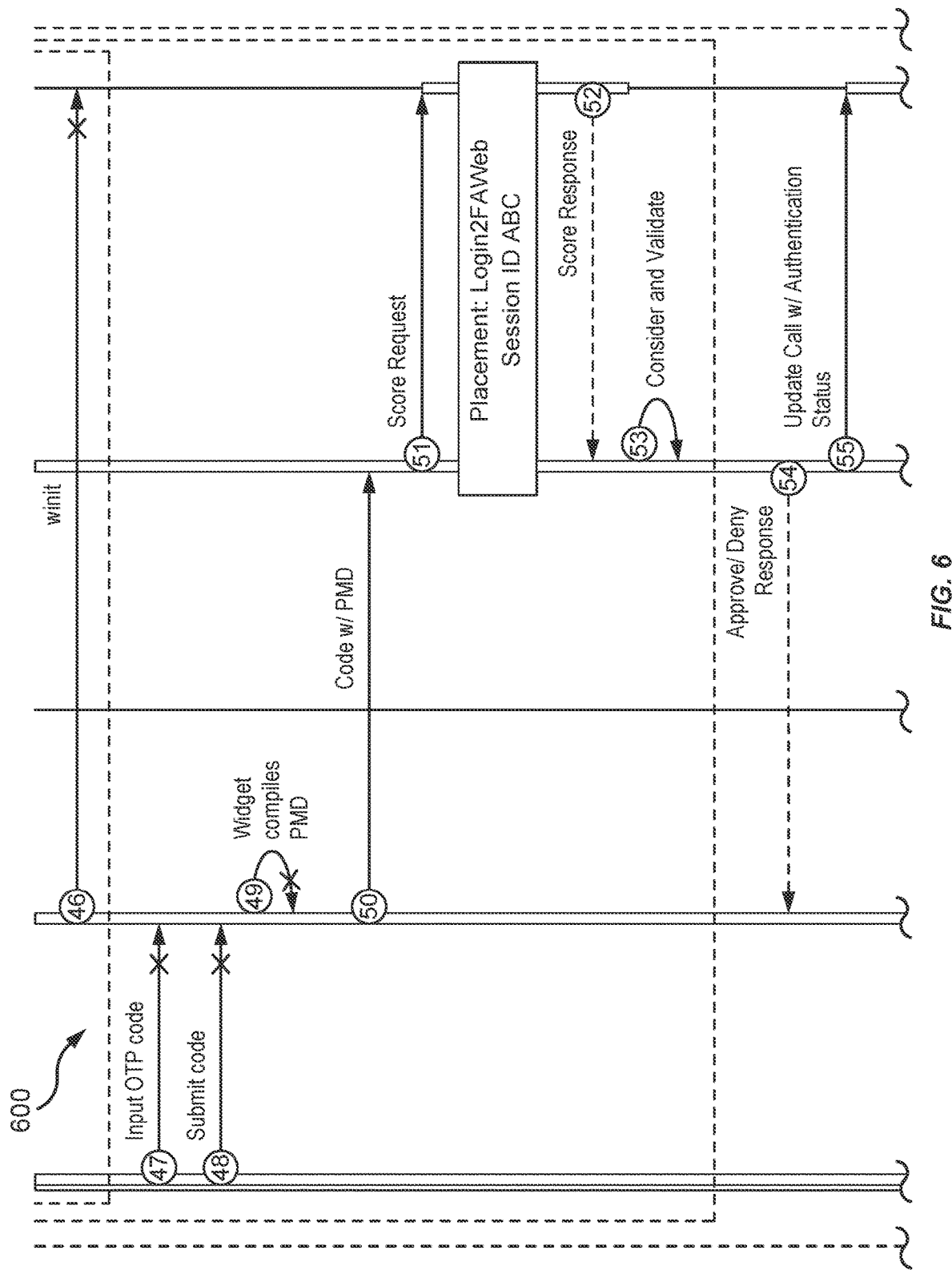
Figure 6:
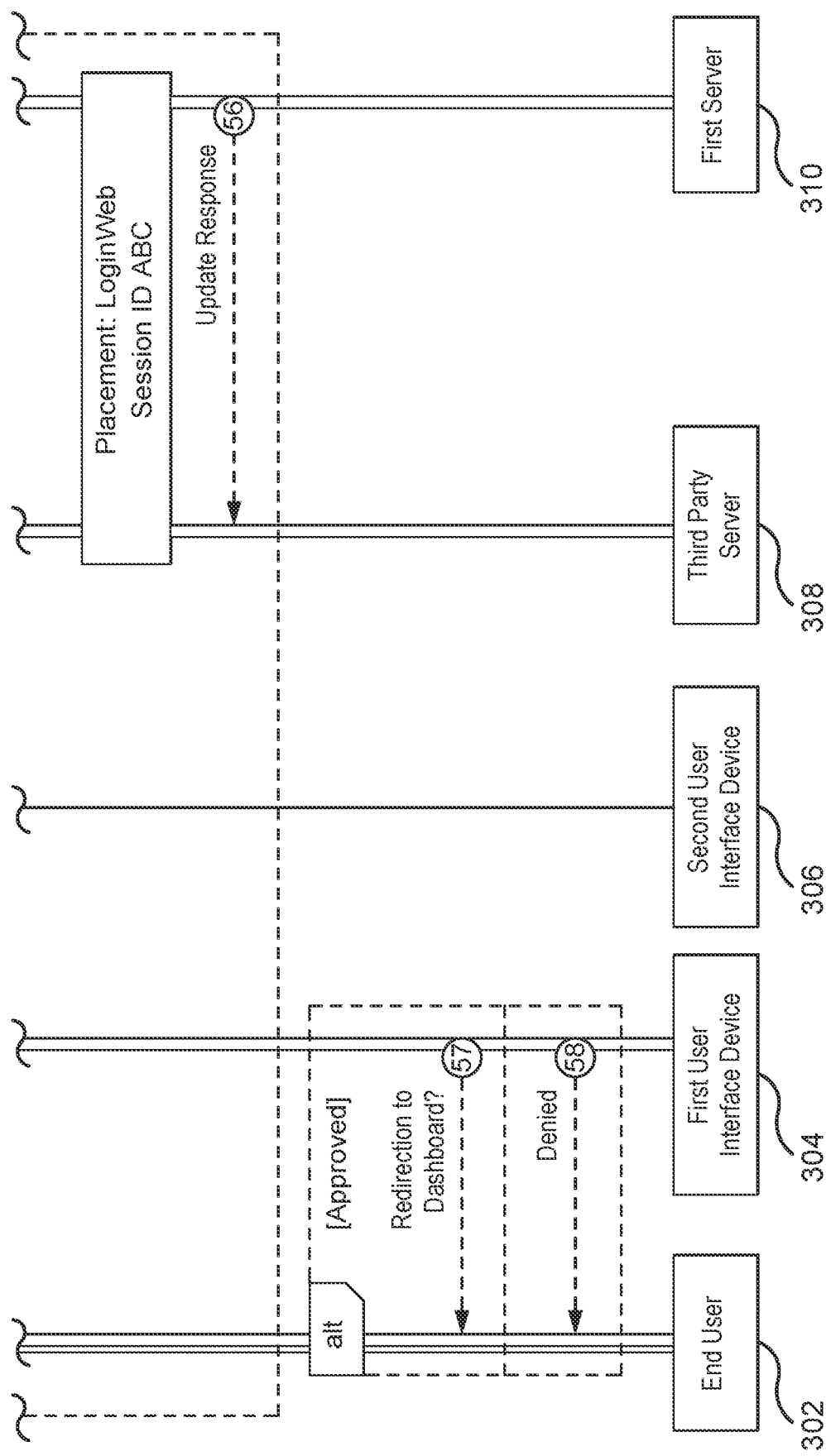

As illustrated in FIG. 3, the end user 302 opens a login page (e.g., a login URL) with the first user interface device 304 (at operation 1). The first user interface device 304 requests a login form from the third-party server 308 (at operation 2). The third-party server 308 responds by sending a login form with an embedded javascript (JS) to the first user interface device 304 (at operation 3).

[Wait for Input]

The first user interface device 304 prompts the end user 302 for a login method (at operation 4). The first user interface device 304 requests QR code authorization polling from the third-party server 308 (at operation 5). For example, the end user 302 opens the application on the first user interface device 304 and has to select a "scan QR code" menu option, after which the first user interface device 304 uses the camera and a typical QR code scanning library to identify and scan the QR code that is displayed on the screen of the other device (e.g., the second user interface device 306. The application is smart enough to recognize this and automate the rest of the flow since the end user 302 is already authenticated to the application, so no further action is required from the end user 302 after scanning the QR code from within the application.

The first user interface device 304 sends wSync to the first server 310, receives a javascript widget from the first server 100, and sends a wInit call to the first server 310 (at operations 6-8, respectively). The wInit call to the first server 310 (e.g., similar to the optional Init calls to the first server 100 in FIG. 2) may be directly sent to the first server 310 or may be indirectly sent to the first server 310, for example, via the third-party server 308. The operations performed at operations 6-8 of FIG. 3 establishes a first session with a first session identifier (ID) (e.g., session ID: ABC) between the first user interface device 304 and the first server 310.

The wInit call includes device attributes associated with the first user interface device 304. For example, the device attributes may include internet protocol (IP) address, user agent, browser attributes, or other device attributes that may be used to identify the device. In some examples, the first server 310 may perform geographic IP lookups based on the included IP address and store the geographic IP lookups and the device attributes in one or more session caches. The information in the one or more session caches may be recalled later when a score request is received from the third-party server 308.

[QR Code Flow]

The end user 302 then opens a mobile application with the second user interface device 306 (at operation 9). The second user interface device 306 loads a mobile software development kit (SDK) and waits for a QR code (at operation 10). The second user interface device 306 prompts the end user 302 for the QR code (at operation 11). The second user interface device 306 sends a wInit call (e.g., a Mobile wInit call) to the first server 310 (at operation 12). The wInit call to the first server 310 (e.g., similar to the optional Init calls to the first server 100 in FIG. 2) may be directly sent to the first server 310 or may be indirectly sent to the first server 310, for example, via the third-party server 308. The operation performed at operation 12 establishes a second session with a second session identifier (ID) (e.g., session ID: DEF) between the second user interface device 306 and the first server 310.

The wInit call includes device attributes associated with the second user interface device 306. For example, the device attributes may include internet protocol (IP) address, user agent, browser attributes, or other device attributes that may be used to identify the device. In some examples, the first server 310 may perform geographic IP lookups based on the included IP address and store the geographic IP lookups and the device attributes in one or more session caches. The information in the one or more session caches may be recalled later when a score request is received from the third-party server 308.

The end user 302 scans a QR code with the second user interface device 306 (at operation 13). The second user interface device 306 sends a QR challenge request to the third-party server 308 (at operation 14). The third-party server 308 sends a first Score Request to the first server 310 (at operation 15).

The first server 310 correlates the second session (e.g., session ID: DEF) with the first session (e.g., session ID: ABC) based on the first Score Request (derived from scanning the QR code) and returns a first score response to the third-party server 308 (at operation 16). The first score response is a score on a correlation of the first session to the second session. For example, the first score response is a score on the location of the first user interface device 304 established in the first session relative to the location of the second user interface device 306 established in the second session.

The third-party server 308 considers and validates the first score response returned by the first server 310 (at operation 17). The third-party server 308 sends a QR challenge response to the second user interface device 306 based on the first score response (at operation 18). The second user interface device 306 requests confirmation of the login attempt from the end user 302 based on the QR challenge response (at operation 19). The second user interface device 306 also sends winit (e.g., Mobile winit) to the first server 310 (at operation 20). The winit includes device attributes associated with the second user interface device 306.

When the end user 302 confirms the login attempt at the second user interface device 306 (at operation 21), the second user interface device 306 prompts the end user to provide a biometric input or a PIN (at operation 22).

When the end user 302 submits the biometric input or the PIN (at operation 23), the second user interface device 306 sends a signed QR challenge to the third-party server 308 (at operation 24). The third-party server 308 sends a second Score Request to the first server 310 (at operation 25).

The first server 310 returns a second score response to the third-party server 308 based on the signed QR challenge (at operation 26). The second score response is a score of the signed QR challenge (and may provide intelligence based off the correlated session). For example, the second score response is a second score on the location of the first user interface device 304 established in the first session relative to the location of the second user interface device 306 established in the second session.

The third-party server 308 considers and validates the second score response returned by the first server 310 (at operation 27). The third-party server 308 may flag the correlated session as authenticated based on the second score response returned by the first server 310 (at operation 28). The third-party server 308 may also start polling for state change detection (at operation 29).

[Approved]

When the second score response indicates an approval, the third-party server 308 redirects the first user interface device 304 to an approved QR authorization page (at operation 30)

[Timed Out]

The third-party server 308 instructs the first user interface device 304 to generate a new QR Code button (at operation 31). The third-party server 308 further updates the score request with the authentication status (at operation 32). The first server 310 sends an update response based on the update request (at operation 33).

[Credentials Flow]

Alternatively, the end user may forego the QR code login method, by selecting password login with the first user interface device 304 (at operation 34). The end user 302 inputs credentials to the first user interface device 304 (at operation 35). The end user 302 submits the credentials to the first user interface device 304 (at operation 36).

The first user interface device 304 uses the widget to compile page mode data (PMD) (at operation 37). The first user interface device 304 sends credentials and the PMD that is compiled to the third-party server 308 (at operation 38). The third-party server 308 sends a Score Request to the first server 310 (at operation 39). The first server 310 sends a Score Response to the third-party server 308 based on the Score Request (at operation 40). The third-party server 308 considers and validates the score response from the first server 310 (at operation 41).

[Step-Up/MFA Needed]

The third-party server 308 may determine an authentication step-up/multi-factor authentication is needed and sends a one-time password (OTP) entry form with a javascript to the first user interface device 304 (at operation 42).

[Wait for Input]

The first user interface device 304 prompts the end user 302 for the OTP code and waits for an input (at operation 43).

[Widget Startup]

The first user interface device 304 starts up a widget by sending wSync to the first server 310 (at operation 44). The first server 310 sends a javascript widget to the first user interface device 304 based on the wSync (at operation 45). The first user interface device 304 sends winit to the first server 310 based on the javascript widget (at operation 46).

The end user 302 inputs OTP code to the first user interface device 304 (at operation 47). The end user submits OTP code at the first user interface device 304 (at operation 48). The first user interface device 304 uses the widget to compile PMD (at operation 49). The first user interface device 304 sends credentials and the PMD that is compiled to the third-party server 308 (at operation 50). The third-party server 308 sends a third Score Request to the first server 310 (at operation 51). The first server 310 sends a third Score Response to the third-party server 308 based on the third Score Request (at operation 52). The third-party server 308 considers and validates the third score response from the first server 310 (at operation 53). The third-party server 308 then sends an approval or denial response based on the consideration and validation of the third score response from the first server 310 (at operation 54). In other words, the third score response from the first server 310 is a control signal that controls whether the third-party server 308 sends an approval response or denial response.

The third-party server 308 further updates the call with the authentication status (at operation 55). The first server 310 sends an update response based on the update call (at operation 56).

[Approved/Denied]

The first user interface device 304 indicates an approval and directs the end user 302 to the resource (at operation 57).

Otherwise, the first user interface device 304 indicates a denial to the end user 302 (at operation 58).

Figure 7:
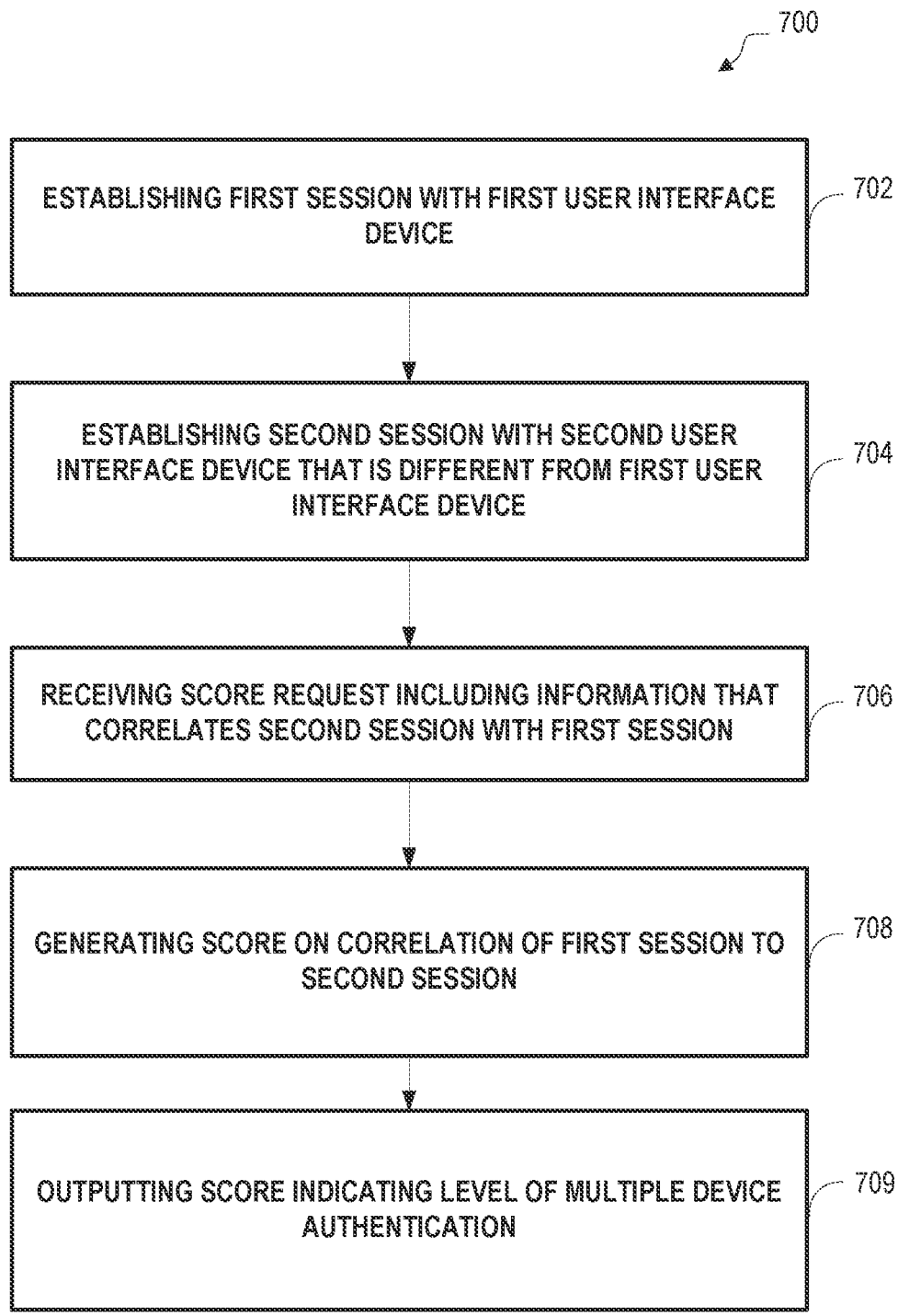
FIG. 7 is a flowchart illustrating a method for identifying a user, in accordance with various aspects of the present disclosure.

FIG. 7 is a flowchart illustrating a method 700 for performing a multiple device authentication, in accordance with various aspects of the present disclosure. FIG. 7 is described with respect to FIGS. 1 and 2.

The method 700 includes establishing, with an electronic processor, a first session with a first user interface device (at block 702).

The method 700 includes establishing, with the electronic processor, a second session with a second user interface device that is different from the first user interface device (at block 704).

The method 700 includes receiving, with the electronic processor, a score request including information that correlates the second session with the first session (at block 706).

The method 700 includes generating, with the electronic processor, a score on a correlation of the first session to the second session (at block 708).

The method 700 includes outputting, with the electronic processor, the score indicating a level of multiple device authentication (at block 710). In some examples, the score is a numerical value representing the assessment of either: high risk user or valid user probability based on available signals/rules/policies. In these examples, risk may be a numerical value that is greater than or equal to zero, where the higher the value indicates the higher the risk. Additionally, in these examples, a valid user may be a numerical value that is less than zero, where the lower the value the better the chance it is a valid user.

In some examples, establishing, with the electronic processor, the first session with the first user interface device includes receiving collected data of a user interface device. For example, the electronic processor 102 of the first server 310 receives collected data of the first user interface device 120. In these examples, establishing, with the electronic processor, the first session with the first user interface device includes determining, with the electronic processor and a unique device identifier (UDID) component, a unique device identifier (UDID) of the user interface device based on device attributes included in the collected data. For example, the electronic processor 102 determines, with a unique device identifier (UDID) component, a unique device identifier (UDID) of the first user interface device 120 based on device attributes included in the collected data.

In some examples, establishing, with the electronic processor, the second session with the second user interface device includes receiving collected data of a second user interface device. For example, the electronic processor 102 of the first server 310 receives collected data of the second user interface device 140. In these examples, establishing, with the electronic processor, the second session with the second user interface device includes determining, with the electronic processor and a unique device identifier (UDID) component, a second unique device identifier (UDID) of the second user interface device based on device attributes included in the collected data. For example, the electronic processor 102 determines, with a unique device identifier (UDID) component, a second unique device identifier (UDID) of the second user interface device 140 based on device attributes included in the collected data.

In some examples, outputting, with the electronic processor, the score includes outputting a MFA authentication response that indicates authentication of the user. For example, in response to determining that the user is authenticated under multi-factor authentication (MFA), the electronic processor 102 controls the communication interface 112 to output a MFA authentication response that indicates authentication of the user.

In one example, one of the device attributes may be an IP address that is registered in a City and State of the United States. In this example, the electronic processor 102 may determine that the location of the first user interface device 120 is in the City and the State of the United States.

Figure 8:
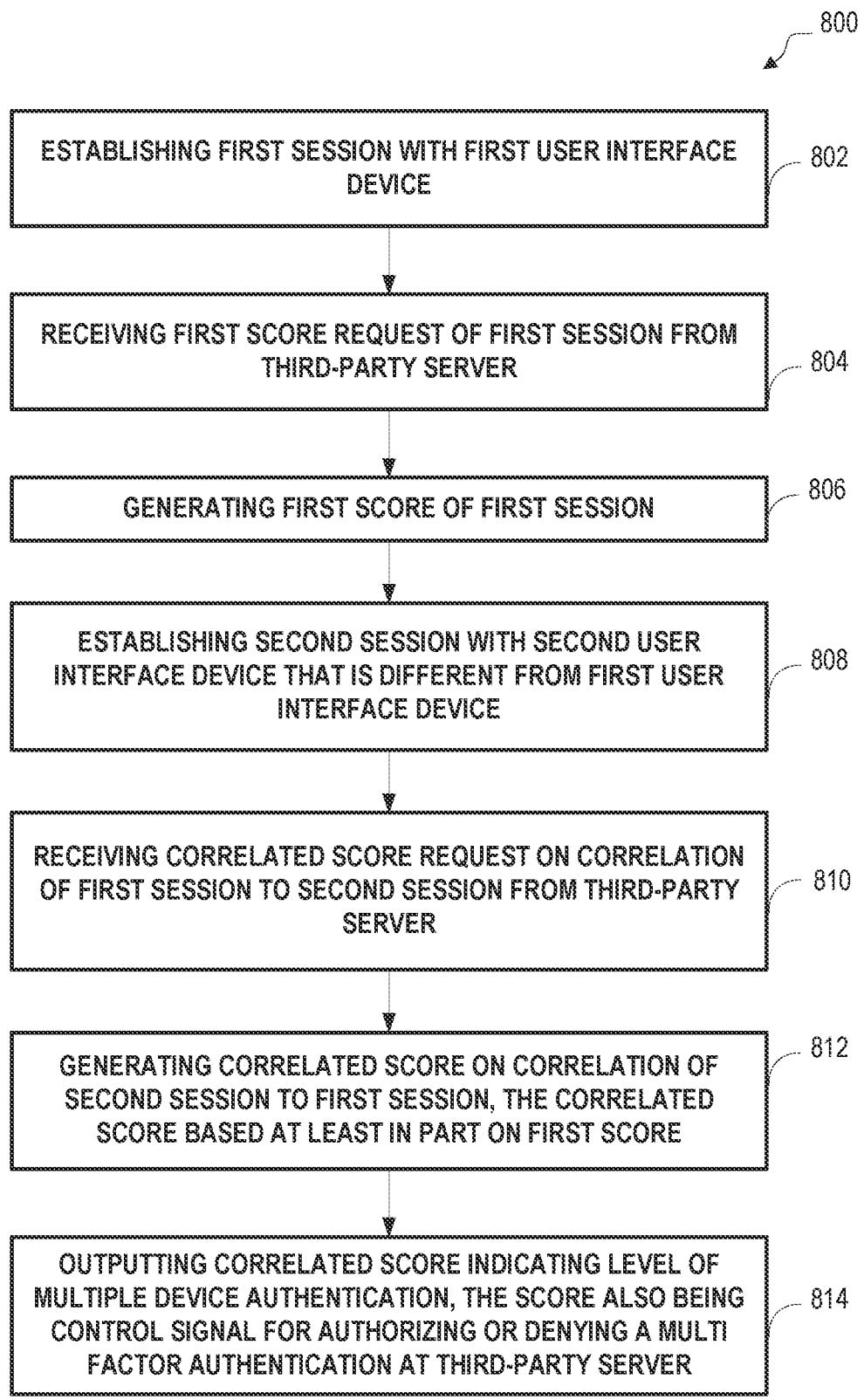
FIG. 8 is a flowchart illustrating a method for performing an alternative example of a multiple device authentication, in accordance with various aspects of the present disclosure.

FIG. 8 is a flowchart illustrating a method 800 for performing an alternative example of a multiple device authentication, in accordance with various aspects of the present disclosure. The method 800 includes establishing, with an electronic processor, a first session with a first user interface device (at block 802).

The method 800 includes receiving, with the electronic processor, a first score request of the first session from a third-party server (at block 804).

The method 800 includes generating, with the electronic processor, a first score of the first session (at block 806).

The method 800 includes establishing, with the electronic processor, a second session with a second user interface device that is different from the first user interface device (at block 808).

The method 800 includes receiving, with the electronic processor, a correlated score request on a correlation of the first session to the second session from the third-party server (at block 810).

The method 800 includes generating, with the electronic processor, a correlated score on the correlation of the second session to the first session, the correlated score based at least in part on the first score (at block 812).

The method 800 includes outputting, with the electronic processor, the correlated score indicating a level of multiple device authentication, the score also being a control signal for authorizing or denying a multi-factor authentication at the third-party server (at block 814).

In some examples, the method 800 may further include receiving, with the electronic processor, a second score request of the second session from the third-party server. In these examples, the method 800 includes generating, with the electronic processor, a second score of the second session. Additionally, in these examples, the correlated score is based at least in part on the first score and the second score.

The following are enumerated examples of devices, methods, and non-transitory computer-readable media of the present disclosure. Example 1. A server for performing multiple device authentication, the server comprising: a memory including a multi-factor authentication (MFA) service, and an electronic processor communicatively coupled to the memory, the electronic processor is configured to: establish a first session with a first user interface device, establish a second session with a second user interface device that is different from the first user interface device, receive, from a third-party server, a score request including information that correlates the second session with the first session, generate a score on a correlation of the first session to the second session, and output the score indicating a level of multiple device authentication, the score also being a control signal for authorizing or denying a multi-factor authentication at the third-party server.

Example 2: the server of Example 1, wherein the score is a numerical value representing the level of multiple device authentication, and the score is based on available signals, rules, policies, or a combination thereof.

Example 3: the server of Example 2, wherein the numerical value that is greater than or equal to zero indicates a high-risk user, and wherein a larger difference between the numerical value and zero indicates a higher likelihood the correlation of the first session to the second session is associated with the high-risk user.

Example 4: the server of Example 3, wherein the numerical value less than zero indicates a valid user, and wherein a larger difference between the numerical value and zero indicates a higher likelihood the correlation of the first session to the second session is associated with the valid user.

Example 5: the server of Example 4, wherein, to output the score indicating the level of multiple device authentication, the electronic processor is further configured to output a MFA authentication response that indicates authentication of the valid user.

Example 6: the server of any of Examples 1-5, wherein, to establish the first session with the first user interface device, the electronic processor is further configured to receive collected data of a user interface device.

Example 7: the server of Example 6, wherein, to establish the first session with the first user interface device, the electronic processor is further configured to determine a unique device identifier (UDID) of the user interface device based on device attributes included in the collected data.

Example 8: the server of Example 7, wherein one of the device attributes may be an IP address that is registered in a City and State of a Country, and wherein the electronic processor is further configured to determine that a location of the first user interface device is in the City and the State of the Country associated with the IP address.

Example 9: the server of any of Examples 1-8, wherein, to establish the second session with the second user interface device, the electronic processor is further configured to receive collected data of a second user interface device.

Example 10: the server of Example 9, wherein, to establish the second session with the second user interface device, the electronic processor is further configured to determine a second unique device identifier (UDID) of the second user interface device based on device attributes included in the collected data.

Example 11. A method for performing multiple device authentication, the method comprising: establishing, with an electronic processor, a first session with a first user interface device; establishing, with the electronic processor, a second session with a second user interface device that is different from the first user interface device; receiving, with the electronic processor, a score request including information that correlates the second session with the first session, the score request being from a third-party server; generating, with the electronic processor, a score on a correlation of the first session to the second session; and outputting, with the electronic processor, the score indicating a level of multiple device authentication, the score also being a control signal for authorizing or denying a multi-factor authentication at the third-party server.

Example 12: the method of Example 11, wherein the score is a numerical value representing the level of multiple device authentication, and the score is based on available signals, rules, policies, or a combination thereof.

Example 13: the method of Example 12, wherein the numerical value that is greater than or equal to zero indicates a high-risk user, and wherein a larger difference between the numerical value and zero indicates a higher likelihood the correlation of the first session to the second session is associated with the high-risk user.

Example 14: the method of Example 13, wherein the numerical value less than zero indicates a valid user, and wherein a larger difference between the numerical value and zero indicates a higher likelihood the correlation of the first session to the second session is associated with the valid user.

Example 15: the method of Example 14, wherein outputting the score indicating the level of multiple device authentication further includes outputting a MFA authentication response that indicates authentication of the valid user.

Example 16: the method of any of Examples 11-15, wherein establishing the first session with the first user interface device further includes receiving collected data of a user interface device.

Example 17: the method of Example 16, wherein establishing the first session with the first user interface device further includes determining a unique device identifier (UDID) of the user interface device based on device attributes included in the collected data.

Example 18 the method of any of Examples 11-17, wherein establishing the second session with the second user interface device further includes receiving collected data of a second user interface device.

Example 19: the method of Example 18, wherein establishing the second session with the second user interface device further includes determining a second unique device identifier (UDID) of the second user interface device based on device attributes included in the collected data.

Example 20. A non-transitory computer-readable medium including instructions that, when executed by an electronic processor, cause the electronic processor to perform a set of operations comprising: establishing a first session with a first user interface device; establishing a second session with a second user interface device that is different from the first user interface device; receiving, from a third-party server, a score request including information that correlates the second session with the first session; generating a score on a correlation of the first session to the second session; and outputting the score indicating a level of multiple device authentication, the score also being a control signal for authorizing or denying a multi-factor authentication at the third-party server.

Thus, the present disclosure provides, among other things, devices, methods, systems and computer-readable media that perform sessions correlation for multiple device authentication. Various features and advantages of the invention are set forth in the following claims.

What is claimed is:

1. A server for performing multiple device authentication, the server comprising:
   a memory including a multi-factor authentication (MFA) service, and
   an electronic processor communicatively coupled to the memory, the electronic processor is configured to:
   establish a first session with a first user interface device,
   establish a second session with a second user interface device that is different from the first user interface device,
   receive, from a third-party server, a score request including information that correlates the second session with the first session,
   generate a score on a correlation of the first session to the second session, and
   output the score indicating a level of multiple device authentication, the score also being a control signal for authorizing or denying a multi-factor authentication at the third-party server.

2. The server of claim 1, wherein the score is a numerical value representing the level of multiple device authentication, and the score is based on available signals, rules, policies, or a combination thereof.

3. The server of claim 2, wherein the numerical value that is greater than or equal to zero indicates a high-risk user, and wherein a larger difference between the numerical value and zero indicates a higher likelihood the correlation of the first session to the second session is associated with the high-risk user.

4. The server of claim 3, wherein the numerical value less than zero indicates a valid user, and wherein a larger difference between the numerical value and zero indicates a higher likelihood the correlation of the first session to the second session is associated with the valid user.

5. The server of claim 4, wherein, to output the score indicating the level of multiple device authentication, the electronic processor is further configured to output a MFA authentication response that indicates authentication of the valid user.

6. The server of claim 1, wherein, to establish the first session with the first user interface device, the electronic processor is further configured to receive collected data of a user interface device.

7. The server of claim 6, wherein, to establish the first session with the first user interface device, the electronic processor is further configured to determine a unique device identifier (UDID) of the user interface device based on device attributes included in the collected data.

8. The server of claim 7, wherein one of the device attributes may be an IP address that is registered in a City and State of a Country, and wherein the electronic processor is further configured to determine that a location of the first user interface device is in the City and the State of the Country associated with the IP address.

9. The server of claim 1, wherein, to establish the second session with the second user interface device, the electronic processor is further configured to receive collected data of a second user interface device.

10. The server of claim 9, wherein, to establish the second session with the second user interface device, the electronic processor is further configured to determine a second unique device identifier (UDID) of the second user interface device based on device attributes included in the collected data.

11. A method for performing multiple device authentication, the method comprising:
    establishing, with an electronic processor, a first session with a first user interface device;
    establishing, with the electronic processor, a second session with a second user interface device that is different from the first user interface device;
    receiving, with the electronic processor, a score request including information that correlates the second session with the first session, the score request being from third-party server;
    generating, with the electronic processor, a score on a correlation of the first session to the second session; and
    outputting, with the electronic processor, the score indicating a level of multiple device authentication, the score also being a control signal for authorizing or denying a multi-factor authentication at the third-party server.

12. The method of claim 11, wherein the score is a numerical value representing the level of multiple device authentication, and the score is based on available signals, rules, policies, or a combination thereof.

13. The method of claim 12, wherein the numerical value that is greater than or equal to zero indicates a high-risk user, and wherein a larger difference between the numerical value and zero indicates a higher likelihood the correlation of the first session to the second session is associated with the high-risk user.

14. The method of claim 13, wherein the numerical value less than zero indicates a valid user, and wherein a larger difference between the numerical value and zero indicates a higher likelihood the correlation of the first session to the second session is associated with the valid user.

15. The method of claim 14, wherein outputting the score indicating the level of multiple device authentication further includes outputting a MFA authentication response that indicates authentication of the valid user.

16. The method of claim 11, wherein establishing the first session with the first user interface device further includes receiving collected data of a user interface device.

17. The method of claim 16, wherein establishing the first session with the first user interface device further includes determining a unique device identifier (UDID) of the user interface device based on device attributes included in the collected data.

18. The method of claim 11, wherein establishing the second session with the second user interface device further includes receiving collected data of a second user interface device.

19. The method of claim 18, wherein establishing the second session with the second user interface device further includes determining a second unique device identifier (UDID) of the second user interface device based on device attributes included in the collected data.

20. A non-transitory computer-readable medium including instructions that, when executed by an electronic processor, cause the electronic processor to perform a set of operations comprising:
    establishing a first session with a first user interface device;
    establishing a second session with a second user interface device that is different from the first user interface device;
    receiving, from a third-party server, a score request including information that correlates the second session with the first session;
    generating a score on a correlation of the first session to the second session; and
    outputting the score indicating a level of multiple device authentication, the score also being a control signal for authorizing or denying a multi-factor authentication at the third-party server.

* * * * *